US012562779B2

(12) United States Patent
Kolych et al.

(10) Patent No.: US 12,562,779 B2
(45) Date of Patent: Feb. 24, 2026

(54) WI-FI/BLUETOOTH ANTENNA DISCONNECT DETECTION

(71) Applicant: Cypress Semiconductor Corporation, San Jose, CA (US)

(72) Inventors: Igor Kolych, Lviv (UA); Kiran Uln, Pleasanton, CA (US); Kameswara Medapalli, Saratoga, CA (US); Sivaram Alukuru Trikutam, Mountain View, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 127 days.

(21) Appl. No.: 18/422,941

(22) Filed: Jan. 25, 2024

(65) Prior Publication Data

US 2025/0247128 A1      Jul. 31, 2025

(51) Int. Cl.
H04B 3/466       (2015.01)
H04W 24/10       (2009.01)
H04W 76/28       (2018.01)

(52) U.S. Cl.
CPC ............ H04B 3/466 (2013.01); H04W 24/10 (2013.01); H04W 76/28 (2018.02)

(58) Field of Classification Search
CPC ... H04B 1/38; H04B 1/40; H04B 3/20; H04B 3/466; H04B 7/0602; H04B 17/12; H04B 17/253; H04B 17/27; H04W 24/10; H04W 76/15; H04W 76/28

USPC ....... 375/133, 141, 219, 224, 259, 260, 262, 375/265, 267; 370/328, 332–334, 339; 455/426.1, 426.2, 463, 500, 67.11, 68, 78, 455/83, 84, 88, 553.1
See application file for complete search history.

(56) References Cited

U.S. PATENT DOCUMENTS

| | | | | |
|---|---|---|---|---|
| 2013/0016024 A1* | 1/2013 | Shi | .......................... | H01Q 5/371 29/729 |
| 2023/0027340 A1* | 1/2023 | Chang | ..................... | H03F 1/025 |
| 2023/0164676 A1* | 5/2023 | Huang | .................. | H04W 48/16 370/252 |

FOREIGN PATENT DOCUMENTS

CN           115047230 A   *   9/2022   .............  G01R 19/00

* cited by examiner

*Primary Examiner* — Young T. Tse

(57)      ABSTRACT

The embodiments described herein are directed at techniques to perform antenna/cable disconnection using co-located communication devices. A first device may transmit a reference signal over a predetermined bandwidth. A parasitic signal corresponding to the reference signal may be received via coupling at a second device that is co-located with the first device. The second device may be coupled to a first end of a cable via a port, with the second end of the cable configured to connect to an antenna. A processing device may determine a ratio of amplitudes of the parasitic signal over a predefined bandwidth. The processing device may then determine, based on the amplitude of the parasitic signal over the predefined bandwidth, a disconnect status of one or more of the antenna and the cable.

17 Claims, 15 Drawing Sheets

*FIG. 5*

COMPUTING DEVICE 205

COMMUNICATION CHANNEL 1

COMMUNICATION CHANNEL 2

ANTENNA 119

ANTENNA 111

CABLE 120

CABLE 112

PORT 130

PORT 132

APPARATUS 100

WLAN TRANSCEIVER 115

BLUETOOTH TRANSCEIVER 110

1100

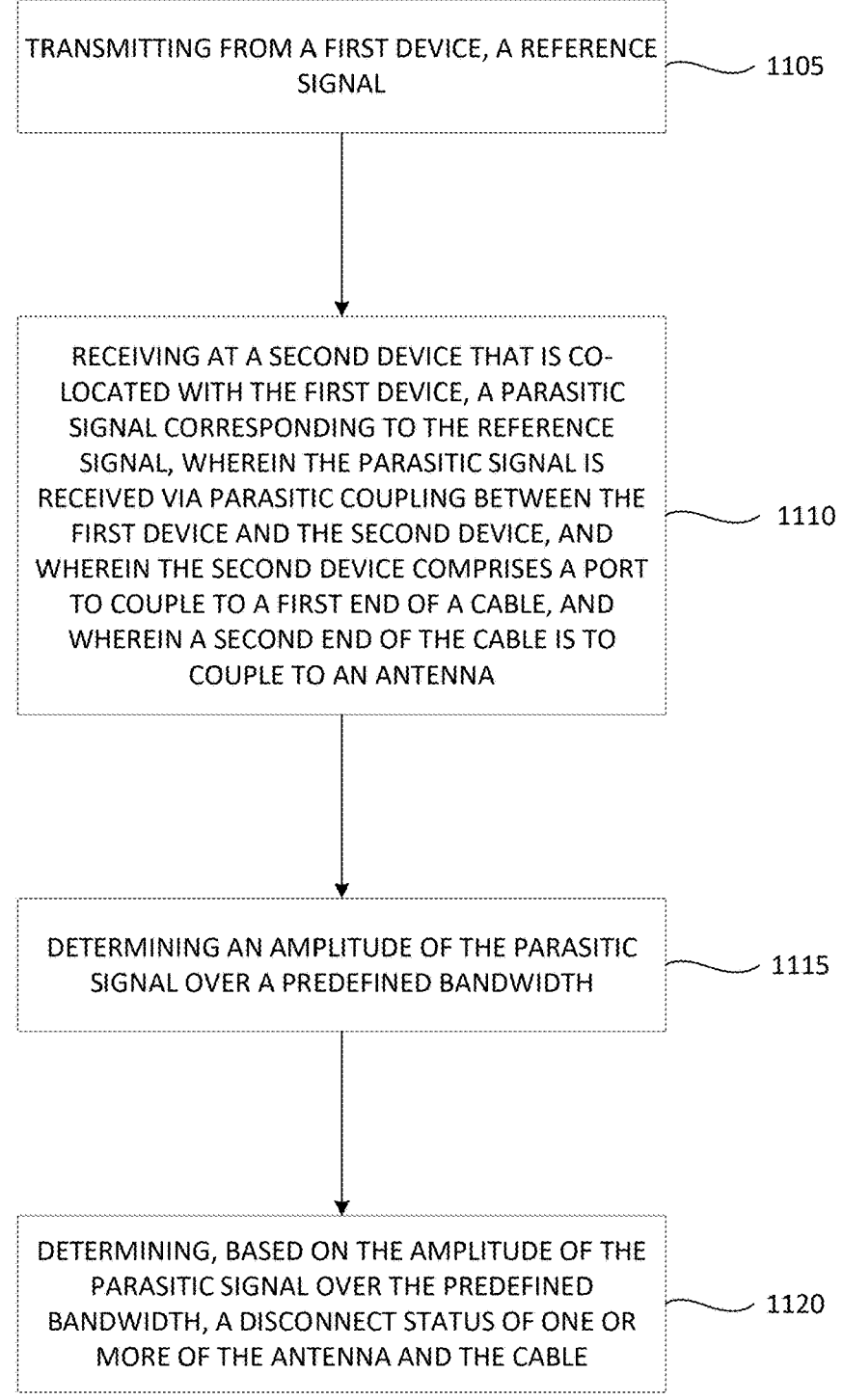

TRANSMITTING FROM A FIRST DEVICE, A REFERENCE SIGNAL ⟍ 1105

RECEIVING AT A SECOND DEVICE THAT IS CO-LOCATED WITH THE FIRST DEVICE, A PARASITIC SIGNAL CORRESPONDING TO THE REFERENCE SIGNAL, WHEREIN THE PARASITIC SIGNAL IS RECEIVED VIA PARASITIC COUPLING BETWEEN THE FIRST DEVICE AND THE SECOND DEVICE, AND WHEREIN THE SECOND DEVICE COMPRISES A PORT TO COUPLE TO A FIRST END OF A CABLE, AND WHEREIN A SECOND END OF THE CABLE IS TO COUPLE TO AN ANTENNA ⟍ 1110

DETERMINING AN AMPLITUDE OF THE PARASITIC SIGNAL OVER A PREDEFINED BANDWIDTH ⟍ 1115

DETERMINING, BASED ON THE AMPLITUDE OF THE PARASITIC SIGNAL OVER THE PREDEFINED BANDWIDTH, A DISCONNECT STATUS OF ONE OR MORE OF THE ANTENNA AND THE CABLE ⟍ 1120

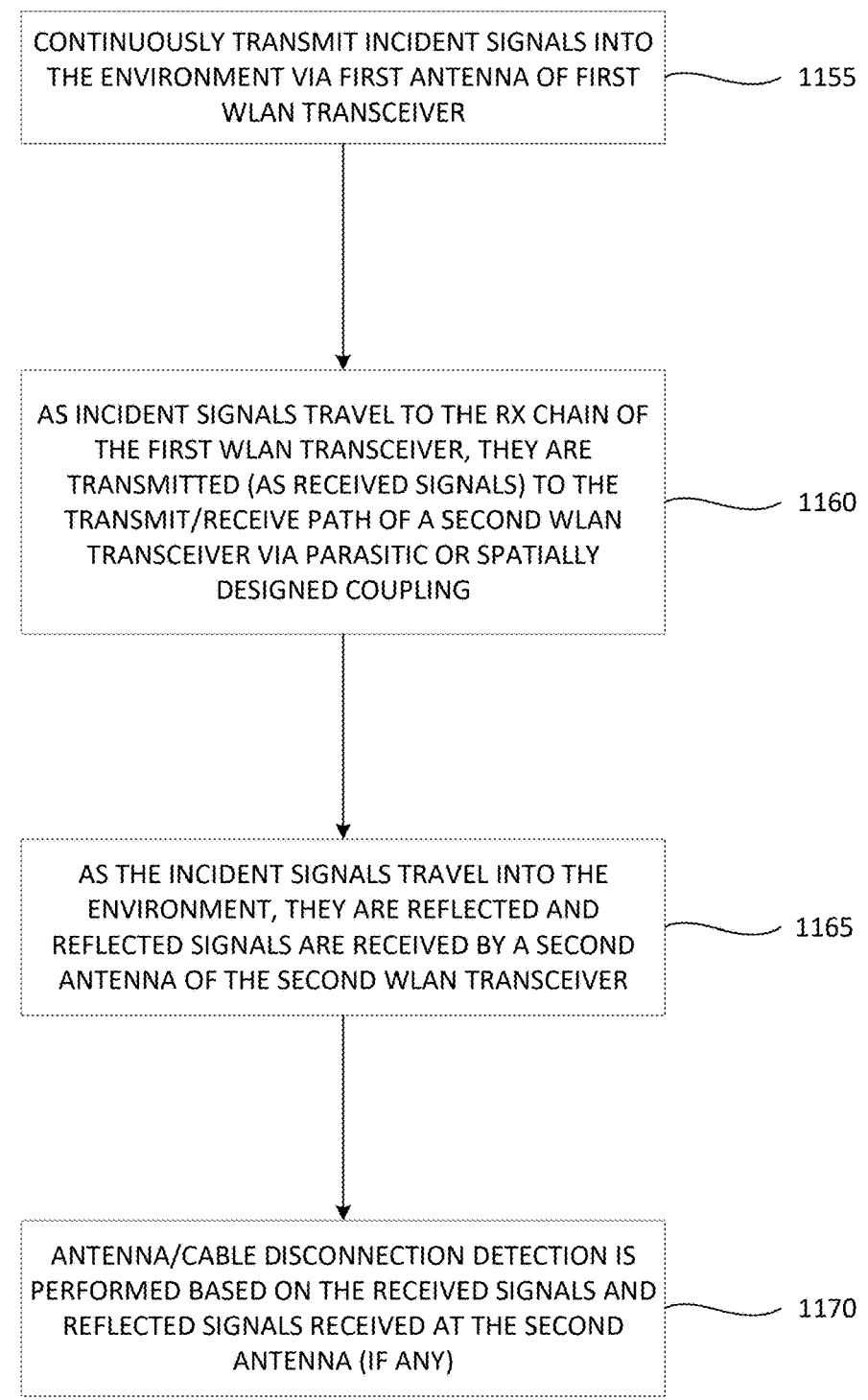

CONTINUOUSLY TRANSMIT INCIDENT SIGNALS INTO THE ENVIRONMENT VIA FIRST ANTENNA OF FIRST WLAN TRANSCEIVER ⟶ 1155

AS INCIDENT SIGNALS TRAVEL TO THE RX CHAIN OF THE FIRST WLAN TRANSCEIVER, THEY ARE TRANSMITTED (AS RECEIVED SIGNALS) TO THE TRANSMIT/RECEIVE PATH OF A SECOND WLAN TRANSCEIVER VIA PARASITIC OR SPATIALLY DESIGNED COUPLING ⟶ 1160

AS THE INCIDENT SIGNALS TRAVEL INTO THE ENVIRONMENT, THEY ARE REFLECTED AND REFLECTED SIGNALS ARE RECEIVED BY A SECOND ANTENNA OF THE SECOND WLAN TRANSCEIVER ⟶ 1165

ANTENNA/CABLE DISCONNECTION DETECTION IS PERFORMED BASED ON THE RECEIVED SIGNALS AND REFLECTED SIGNALS RECEIVED AT THE SECOND ANTENNA (IF ANY) ⟶ 1170

FIG. 11B

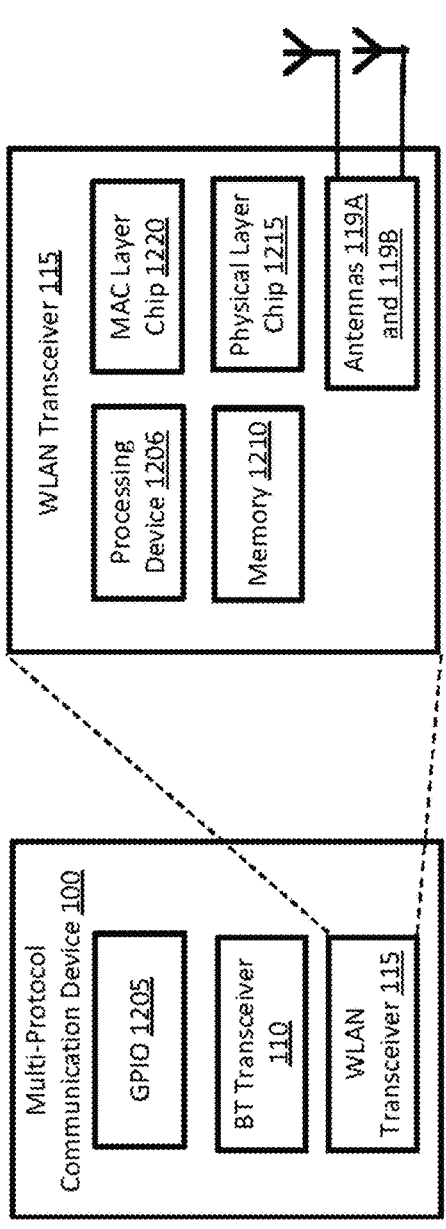
FIG. 12

WI-FI/BLUETOOTH ANTENNA
DISCONNECT DETECTION

TECHNICAL FIELD

The present disclosure relates generally to co-located communication devices that each employ any of a variety of communication protocols (e.g., Wi-Fi™ and Bluetooth™), and more particularly to detecting antenna/cable disconnections on co-located communication devices.

BACKGROUND

Various communication devices may include transceivers configured to transmit/receive data using any of a variety of communication protocols. For example, a transceiver can transmit/receive signals using the Wi-Fi protocol, the Bluetooth protocol, or the WiMAX protocol, among others. In some cases, multiple transceivers can be implemented in a single multi-protocol combination device. For example, a single device can include Bluetooth (BT) transceivers as well as wireless local area network (WLAN) transceivers (operating with the Wi-Fi protocol, for example), which may utilize their own transmission hardware such as antennas, cables etc.

BRIEF DESCRIPTION OF THE DRAWINGS

The present embodiments are illustrated by way of example, and not of limitation, in the figures of the accompanying drawings.

FIG. 5 is a diagram illustrating the amplitude (as a function of frequency) of a parasitic reference signal for different antenna/cable disconnection scenarios and different antenna matching scenarios, according to some embodiments of the present disclosure

FIG. 11A is a flow diagram of a method of antenna/cable disconnect detection, according to some embodiments of the present disclosure.

FIG. 11B is a flow diagram of a method of antenna/cable disconnect detection using Wi-Fi sensing, according to some embodiments of the present disclosure.

FIG. 12 is a detailed block diagram of the wireless communication device of FIG. 1, according to some embodiments of the present disclosure.

DETAILED DESCRIPTION

Figure 1:
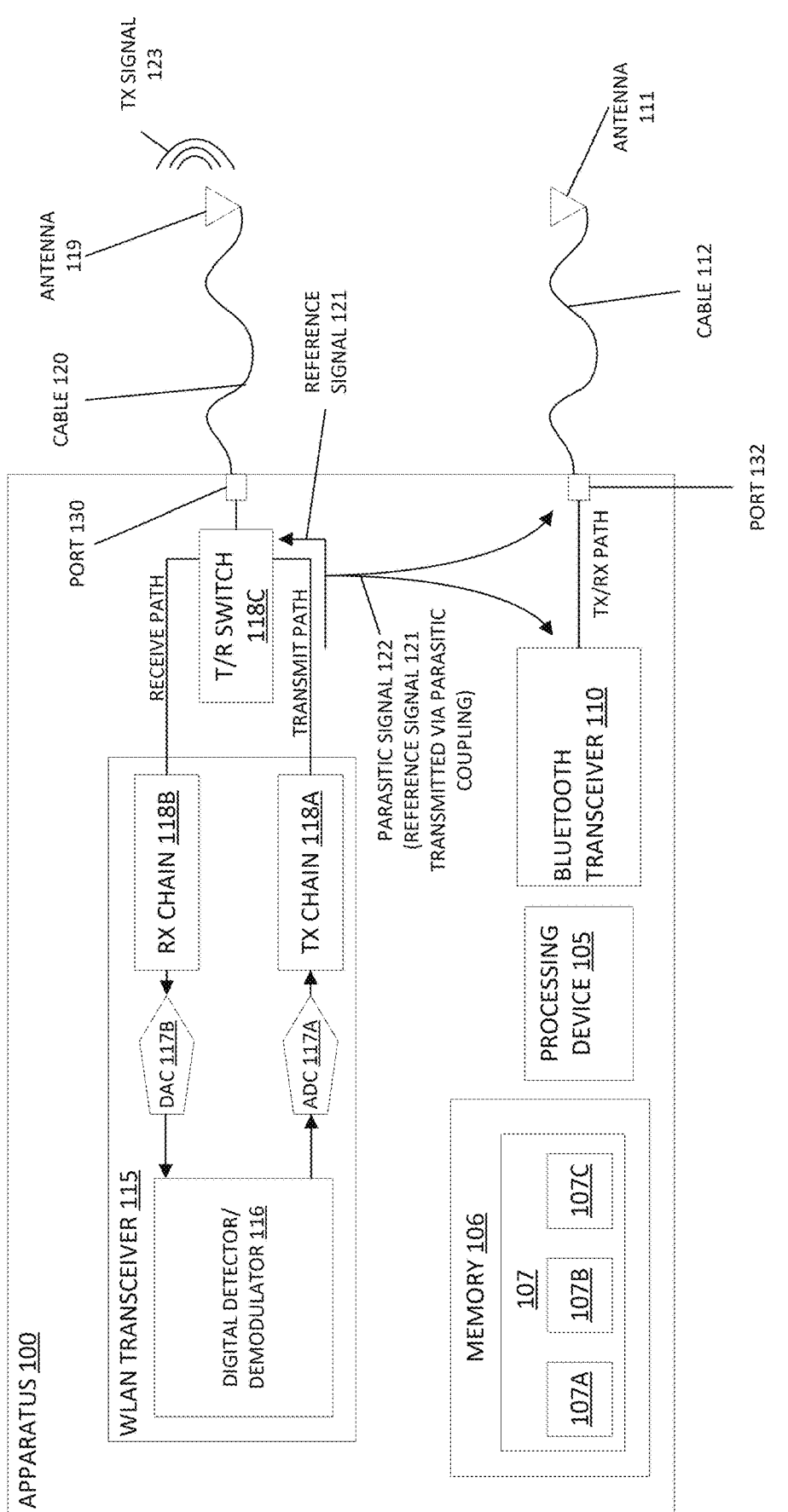
FIG. 1 is a block diagram illustrating a wireless communication device, according to some embodiments of the present disclosure.

In the following description, for purposes of explanation, numerous specific details are set forth in order to provide a thorough understanding of the present embodiments. It will be evident, however, to one skilled in the art that the present embodiments may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment. The phrase "in one embodiment" located in various places in this description does not necessarily refer to the same embodiment.

Wireless communication in multi-protocol devices may be interrupted for a variety of reasons. One reason involves disconnects in the antenna and/or cable used by a transceiver to send/receive information. Detecting antenna or cable disconnection in a multi-protocol device is important for ensuring proper operation of the multi-protocol device. This is especially important for automotive applications where the transceiver chips may be located farther away from their corresponding antennas (e.g., to account for ideal antenna positioning) and use radio frequency (RF) cables to connect the transceiver chips to their corresponding antennas. If a cable connecting a transceiver chip to its corresponding antenna is severed, it is difficult to know/locate where along its length the cable is severed. A technician must be able to rule out physical antenna disconnection as a potential issue without having to open up sections of the car, which could be costly in terms of time and resources.

Thus, a diagnostic test that is exercisable from a settings menu of a vehicle infotainment system, for example, is desirable. Many current solutions utilize dedicated antenna/cable disconnect detection hardware on their multi-protocol devices. However, such solutions are costly from a financial perspective as well as from a hardware real-estate perspective.

The embodiments described herein are directed at techniques to perform antenna/cable disconnection using co-located communication devices. Such techniques may be implemented, for example, as part of a multi-protocol communication device that implements co-located transceivers and eliminates the need for dedicated antenna/cable disconnect hardware, discussed above. A first transceiver (also referred to as a reference device) may transmit a reference signal over a predetermined bandwidth. The reference signal may be transmitted as a parasitic signal via parasitic or spatially designed coupling to a second transceiver (that is co-located with the first transceiver).

A processing device of the multi-protocol communication device may determine the amplitude of the parasitic signal over the predetermined bandwidth. This is because as discussed in further detail herein, the amplitude ratio of the parasitic signal for multiple frequencies in the predetermined bandwidth is different for different antenna/cable disconnection scenarios. The processing device may implement a classifier that has reference data including the amplitude shape and average amplitude of a reference signal received at the second device over a wide range of frequencies (including the predetermined bandwidth) for each of a set of different antenna/cable disconnect scenarios. The processing device may compare the amplitude of the parasitic signal over the predetermined bandwidth to the reference data for each of the set of different antenna/cable disconnect scenarios to classify the amplitude of the parasitic signal over the predetermined bandwidth into one of the set of antenna/cable disconnect scenarios.

In one embodiment, an apparatus is disclosed, the apparatus comprising a first device to transmit a reference signal over a predetermined bandwidth and a second device to receive a parasitic signal corresponding to the reference signal via parasitic or spatially designed coupling, where the second device is co-located with the first device. The apparatus may comprise a port to couple a first end of a cable with the second device, wherein the second end of the cable is configured to connect to an antenna. The apparatus may further comprise a processing device to determine an amplitude of the parasitic signal over a predefined bandwidth. The processing device may determine, based on the amplitude of the parasitic signal over the predefined bandwidth, a disconnect status of one or more of the antenna and the cable.

FIG. 1 is a block diagram illustrating a multi-protocol communication device 100 (hereinafter referred to as device 100), which may be a multi-protocol combination communication chip that combines a first transceiver operating using a first communication protocol and a second transceiver operating using a second communication protocol. It should be noted that the communication protocols used by the first and second transceivers do not need to be different. In the example of FIG. 1, the device 100 may include a BT transceiver 110 and a WLAN transceiver 115 which are co-located on the same chip. In addition, the device 100 may be implemented on a single die, or may be implemented using multiple dies in a single package. The WLAN transceiver 115 may comprise a transmit chain 118A and a receive chain 118B and both the transmit chain 118A and the receive chain 118B may be comprised of signal processing components such as a low noise amplifier, a mixer, a variable gain amplifier, and a low pass filter (not illustrated). The WLAN transceiver 115 may further comprise a T/R switch 118C to switch between the Tx chain 118A and the Rx chain 118B. More specifically, the T/R switch 118C may selectively couple the port 130 to the Tx chain 118A to allow for transmission of signals via an antenna 119 or couple the port 130 to the Rx chain 118B to allow for reception of signals via the antenna 119. A cable 120 may be coupled to the port 130 and to the antenna 119. The Tx chain 118A may also be coupled to an analog to digital converter (ADC) 117A which it may use to digitize received signals and output the digitized signals to a digital demodulator 116 (also referred to as a digital detector) which may extract any information content from the received digitized signals (e.g., by extracting the information bearing signal from a carrier wave). Similarly, the BT transceiver 110 may be coupled to port 132, to which a first end of the cable 112 may be coupled. A second end of the cable 112 may be coupled to the antenna 111, through which the BT transceiver 110 may send and receive signals. Although illustrated with the BT transceiver 110 and the WLAN transceiver 115 being located on the same chip, this is not a requirement and the BT transceiver 110 and the WLAN transceiver 115 may be co-located while still being implemented on different chips.

As shown in FIG. 1, device 100 further includes a processing device 105 and a memory 106 which may include an antenna/cable disconnect detection module 107. Processing device 105 may execute the module 107 to perform the antenna/cable disconnect detection techniques described herein. Although illustrated by way of example as a software module stored in memory 106 and accessed/executed by processing device 105, the functionality of the module 107 may be realized using dedicated hardware (e.g., an application specific integrated circuit (ASIC)) or as a firmware module within the processing device 105. The module 107 may include a wireless communication and environment sensing module 107A, a disconnect detection module 107B and an antenna connection quality module 107C. Although illustrated as having a single processing device 105 to operate both the BT transceiver 110 and the WLAN transceiver 115, this is also not a limitation and each of the BT transceiver 110 and the WLAN transceiver 115 may include their own memory in which module 107 may be stored and their own processing devices to execute the module 107 to perform the associated functions described herein.

FIG. 1 illustrates an example where the processing device 105 is determining a disconnect status of the antenna 111 and/or cable 112 of the BT transceiver 110, and thus the WLAN transceiver 115 acts as the reference device and the BT transceiver 110 acts as the receiver device (i.e., the device being diagnosed) as discussed in further detail herein. As will be seen, the processing device 105 may use the method discussed herein to determine a disconnect status of the antenna 119 and/or its respective cable 120 by using the WLAN transceiver 115 as the receiver device and the BT transceiver 110 as the reference device.

As discussed above, the WLAN transceiver 115 may utilize a T/R switch 118C to switch between the Tx chain 118A and the Rx chain 118B. Upon executing the module 107B, the processing device 105 may utilize the Tx chain 118A to transmit a reference signal 121 over a predetermined bandwidth using the antenna 119. The T/R switch 118C may couple the port 130 to the Tx chain 118A to allow for transmission of the reference signal 121 via the antenna 119. As the reference signal 121 travels from the Tx chain 118A to the T/R switch 118C (the transmit path of the T/R switch 118C), it may be received by the Rx chain 118B via the receive path of the T/R switch 118C as shown in FIG. 1. In some embodiments, the reference signal 121 may be received by the Rx chain 118B via coupling occurring inside the WLAN transceiver 115 or coupling outside the WLAN transceiver (i.e., coupling may be occur before or after the T/R switch 118C). It should be noted that the signal that is actually transmitted by the antenna 119 (shown as Tx signal 123 in FIG. 1) may be different from the reference signal 121 due to reflection caused by improper operation of the antenna 119. In addition, as the reference signal 121 travels from the Tx chain 118A to the T/R switch 118C, it may be transmitted (as parasitic signal 122) to the transmit/receive path of the BT transceiver 110 via parasitic or spatially designed coupling as shown in FIG. 1. The Bluetooth transceiver 110 may include a port 132 to which a first end of cable 112 is connected. The other end of the cable 112 may be connected to the antenna 111.

As shown in FIG. 1, the energy of the parasitic signal 122 may split into two paths, a first path directly to the BT transceiver 110 and a second path along the cable 112 towards the antenna 111 (assuming the cable 112 is connected to the port 132 as discussed herein). The processing device 105 may detect the antenna 111/cable 112 connection state based on the amplitude of the parasitic signal 122 over the predetermined bandwidth (i.e., the ratio of the different amplitudes of the parasitic signal 122 over the predetermined bandwidth) as discussed in further detail herein.

The predetermined bandwidth may be determined by the devices involved in the disconnect detection. If the devices involved in the disconnect detection are a combination of Wi-Fi and BT/BLE transceivers as shown in the example of FIG. 1, the predetermined bandwidth may be limited by a bandwidth restriction of the BT/BLE device. For example, the BT transceiver 110 may be restricted to 80 MHz, and thus the predetermined bandwidth may be set to 80 MHz. In such situations the processing device 105 may transmit the reference signal 121 as a series of tones over the predetermined bandwidth, as a single signal that switches over different channels within the predetermined bandwidth or a set of sub-carriers (multiple tones).

If the devices involved in the disconnect detection are both Wi-Fi transceivers, a very wide bandwidth is available and the predetermined bandwidth may span a wide frequency range. The processing device 105 may transmit the reference signal 121 as a series of tones over the predetermined bandwidth or as a single signal that contains multiple tones within the predetermined bandwidth.

Figure 2A:
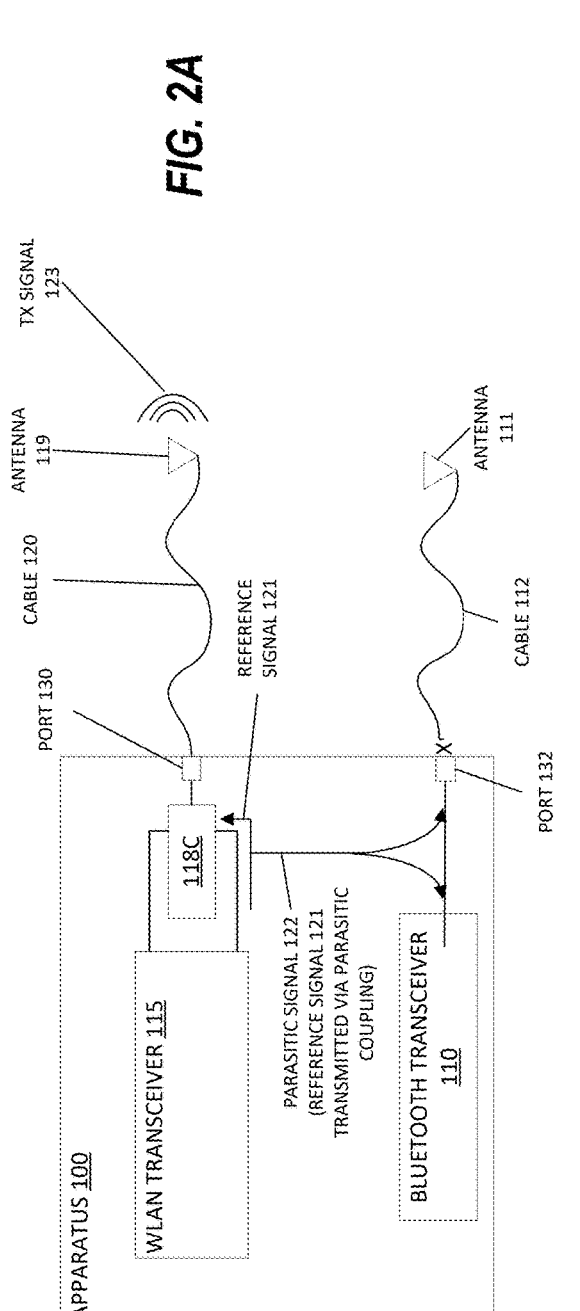
FIGS. 2A-2C are block diagrams that each illustrate the wireless communication device of FIG. 1 in a particular antenna/cable disconnection scenario, according to some embodiments of the present disclosure.
Figure 3:
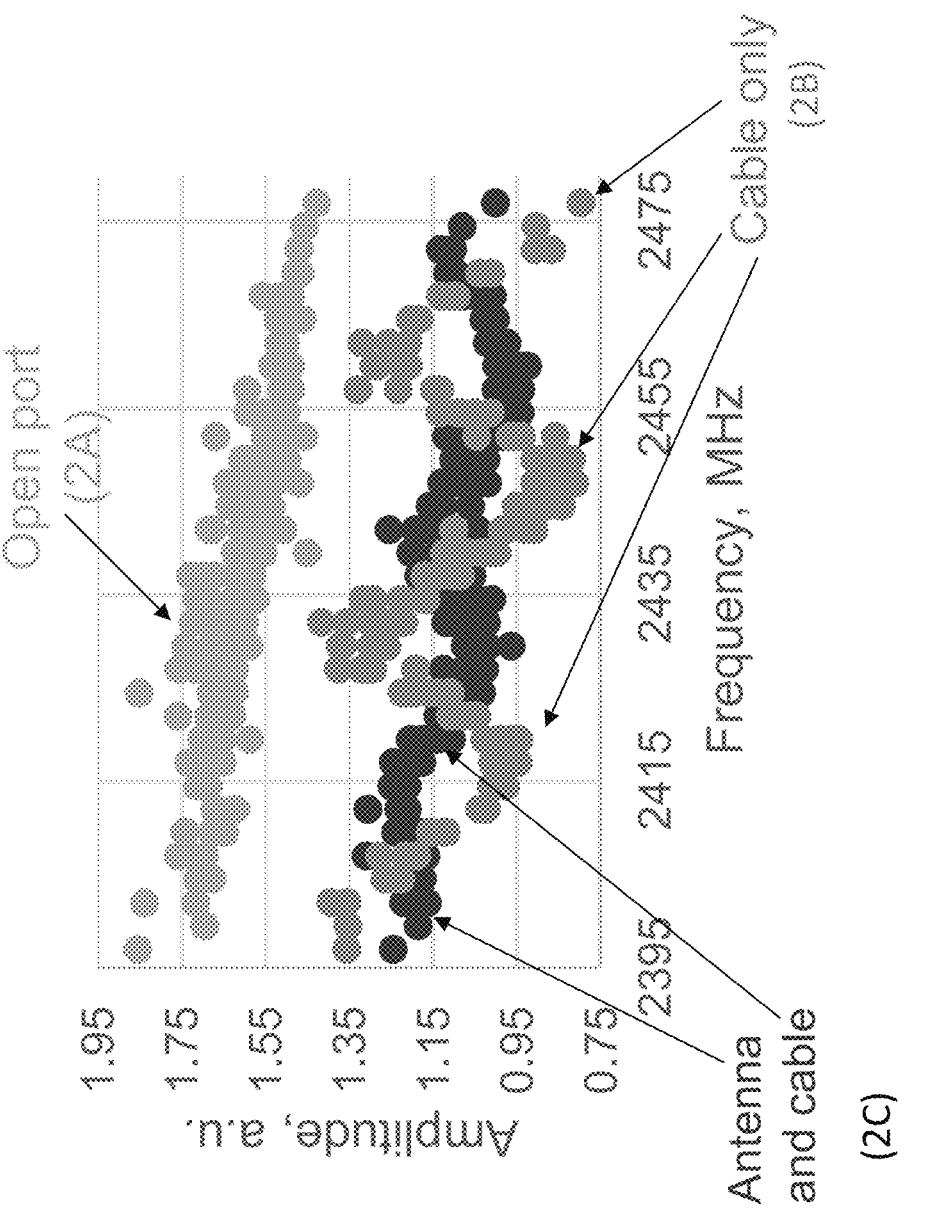
FIG. 3 is a diagram illustrating the amplitude of a parasitic reference signal over a predetermined bandwidth for each of the antenna/cable disconnection scenarios illustrated in FIGS. 2A-2C, according to some embodiments of the present disclosure.

When the cable 112 is disconnected from the port 132 (i.e., the cable 112 and the antenna 111 are both disconnected) as shown in FIG. 2A, all of the energy of the parasitic signal 122 follows the first path directly to the BT transceiver 110 and there is no energy loss resulting from part of the energy of the parasitic signal 122 travelling on the cable 112 (e.g., on the second path). Thus, in scenarios where the cable 112 is disconnected from the port 132, a relatively large amplitude is expected for the parasitic signal 122 over the entire range of the predetermined bandwidth as shown in FIG. 3.

Figure 2B:
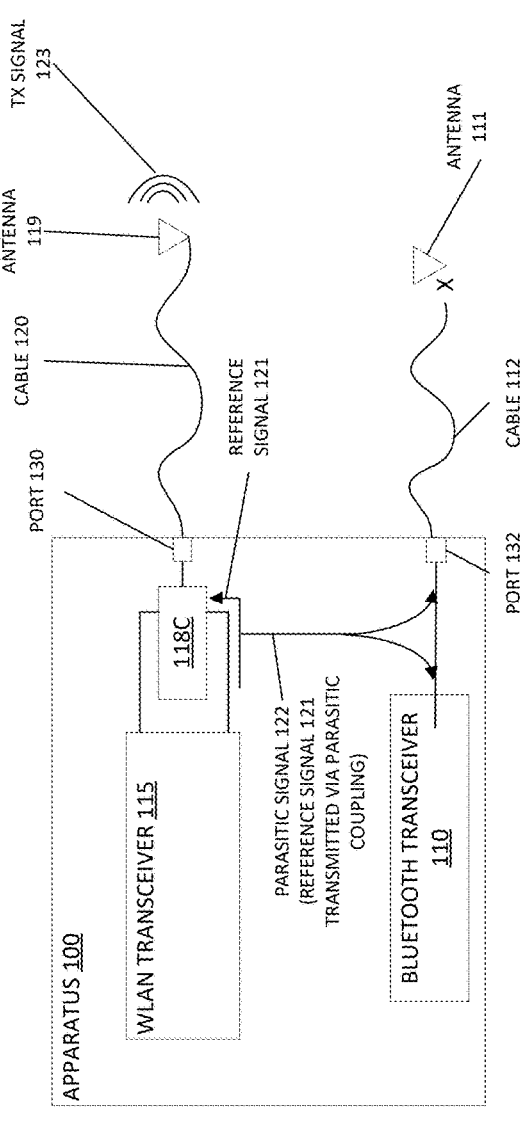

FIG. 2B illustrates a scenario where the cable 112 is connected to the port 132, but is disconnected from the antenna 111. The cable 112 may be disconnected from the antenna 111 because the antenna 111 has simply been disconnected, a connection/interface between the cable 112 and the antenna 111 is broken, or because the cable 112 has been cut or severed at some point along its length. Because the cable 112 is connected to the port 132, part of the energy of the parasitic signal 122 travels on the second path and upon reaching the open end of the cable 112, propagates back along the cable 112 and can be received by BT transceiver 110. However, the open end of the cable 112 is not impedance matched with its surroundings (e.g., air). Thus, as the parasitic signal 122 propagates back along the cable 112, it will experience energy loss due to the cable 112 itself. Because the antenna 111 is disconnected, there is no interference as a result of signals received by antenna 111. As a result, in scenarios where the cable 112 is connected to the port 132, but is disconnected from the antenna 111, the expected amplitude of the parasitic signal 122 is generally lower over the range of the predetermined bandwidth compared to situations where the cable 112 is disconnected from the port 132 (as shown in FIG. 3). In addition, there is interference (constructive and destructive) between signals directly injected into receiver and reflected from the cable end that causes a large minima/maxima in the amplitude of the parasitic signal 122 over the range of the predetermined bandwidth as shown in FIG. 3.

Figure 2C:
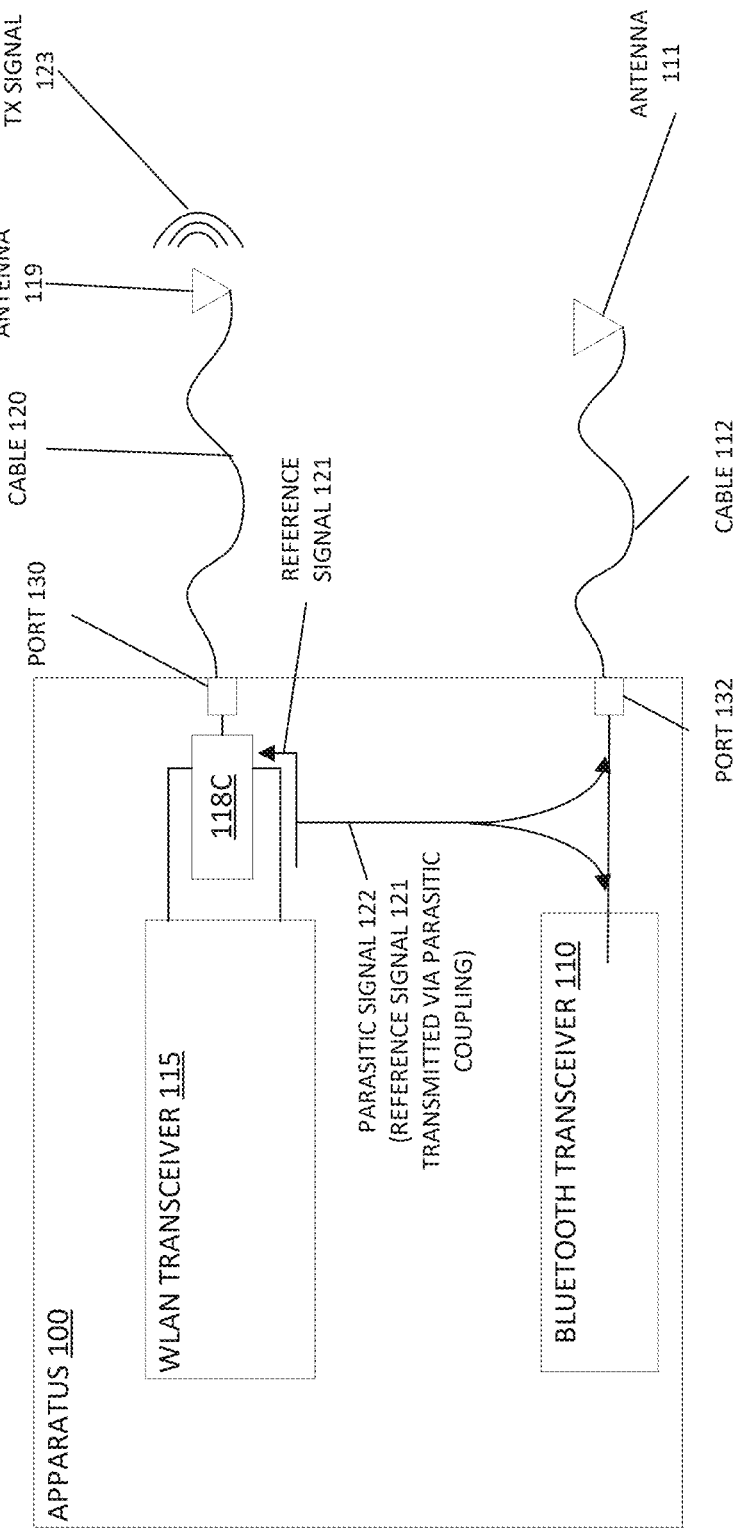

FIG. 2C illustrates a scenario where the cable 112 is connected to the port 132 and to the antenna 111. Part of the energy of the parasitic signal 122 travels on the second path and upon reaching the antenna 111, will experience energy loss via the antenna 111 as the cable 112 and the antenna 111 are impedance matched. The impedance match between the antenna 111 and the cable 112 also means that the parasitic signal 122 is not reflected at the antenna 111. Thus, there is no interference resulting from reflection. It should be noted however, that if the antenna 111 is operating improperly (e.g., is damaged or suffering from a poor connection to the cable 112), there may be reflection that causes interference. The remaining energy of the parasitic signal 122 propagates back and can be received by BT transceiver 110. However, in some scenarios, the parasitic signal 122 will experience some interference due to other signals received by the antenna 111. For example, if the antennas 119 and 111 are closely located, the Tx signal 123 transmitted by antenna 119 may be received at the antenna 111 via antenna coupling and may interfere with the parasitic signal 122. As a result, in scenarios where the cable 112 is connected to the port 132, and is also connected to the antenna 111, the expected amplitude of the parasitic signal 122 is generally lower over the range of the predetermined bandwidth compared to situations where the cable 112 is disconnected from the port 132 as shown in FIG. 3. It should be noted that the expected amplitude of the parasitic signal 122 is generally lower over the range of the predetermined bandwidth assuming the coupling between the antenna 119 and the antenna 111 is relatively small. If the coupling between the antenna 119 and the antenna 111 is large, the expected amplitude of the parasitic signal 122 will generally be comparable or larger over the range of the predetermined bandwidth compared to situations where the cable 112 is disconnected from the port 132. In addition, it will contain an interference image caused by the Tx signal 123 received by the antenna 111 from the antenna 119 via antenna coupling as discussed hereinabove as well as reflection of the reference signal 121 from conductive objects in the environment of the device 100. As shown in FIG. 3, there are minima/maxima in the amplitude of the parasitic signal 122 over the range of the predetermined bandwidth caused by the interference discussed herein with respect to FIG. 2C.

Referring back to FIG. 1, upon measuring the amplitude of the parasitic signal 122 over the range of the predetermined bandwidth, the processing device 105 may classify the amplitude of the parasitic signal 122 over the range of the predetermined bandwidth into one of the scenarios illustrated in FIGS. 2A-2C in order to determine the disconnect status of the cable 112 and/or the antenna 111 as discussed in further detail herein.

Figure 4:
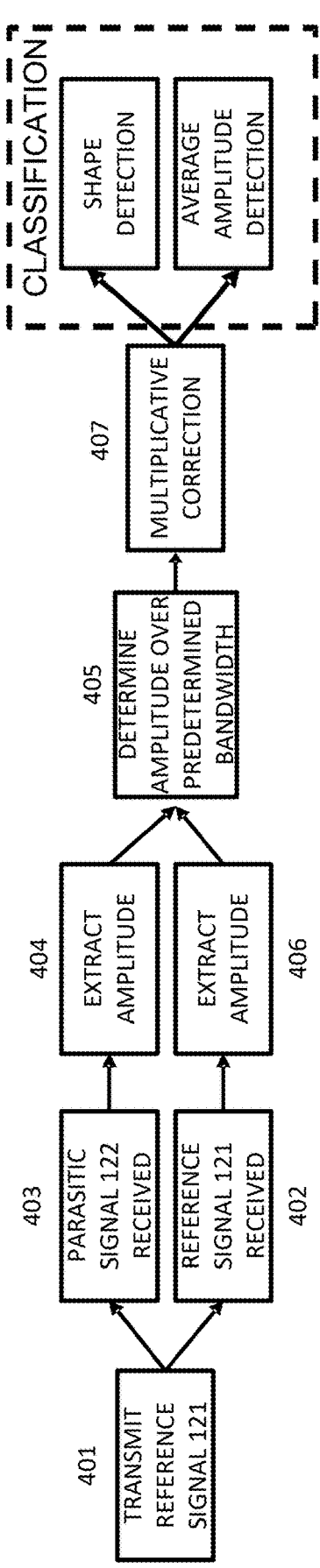
FIG. 4 is a functional block diagram illustrating an antenna/cable disconnect detection method, according to some embodiments of the present disclosure.

FIG. 4 illustrates a functional block diagram of the disconnect detection method performed by execution of the module 107B, in accordance with some embodiments of the present disclosure. At block 401 the processing device 105 may use the Tx chain 118A to transmit the reference signal 121 over the predetermined bandwidth using the antenna 119. At block 402, as the reference signal 121 travels from the Tx chain 118A to the T/R switch 118C (the transmit path of the T/R switch 118C), it may be received by the Rx chain 118B via the receive path of the T/R switch 118C as shown in FIG. 1. In some embodiments, the reference signal 121 may be received by the Rx chain 118B via coupling occurring inside the WLAN transceiver 115 or coupling outside the WLAN transceiver (i.e., coupling may be occur before or after the T/R switch 118C). It should be noted that the signal that is actually transmitted by the antenna 119 (shown as Tx signal 123 in FIG. 1) may be different from the reference signal 121 due to reflection caused by improper operation of the antenna 119. In addition, as the reference signal 121 travels from the Tx chain 118A to the T/R switch 118C, it may be transmitted (as parasitic signal 122) to the transmit/receive path of the BT transceiver 110 via parasitic or spatially designed coupling at block 403 (as shown in FIG. 1). As used herein, spatially designed coupling may refer to coupling occurring as a result of the proximity of two or more conductors or paths within a device.

At block 404, the processing device 105 may extract the amplitude of the parasitic signal 122 (e.g., extract the amplitude from each parasitic signal 122 tone or from each channel the parasitic signal 122 is received over) and at block 405 may determine the amplitude of the parasitic signal 122 over the predetermined bandwidth (i.e., the ratio of the different amplitudes of the parasitic signal 122 over the predetermined bandwidth). This is because as discussed hereinabove, the amplitude ratio of the parasitic signal 122 for multiple frequencies in the predetermined bandwidth behaves differently for different antenna/cable disconnection scenarios as discussed with respect to FIGS. 2A-3.

In some embodiments, at block 406 the processing device 105 may extract the amplitude of the reference signal 121 received by the Rx chain 118B via the receive path of the T/R switch 118C (e.g., extract the amplitude from each received signal 121 tone or from each channel the reference signal 121 is received over) and determine the amplitude of the reference signal 121 over the predetermined bandwidth (i.e., the ratio of the different amplitudes of the reference signal 121 over the predetermined bandwidth). At block 405, the processing device 105 may utilize the amplitude of the reference signal 121 over the predetermined bandwidth to compensate for distortions in the amplitude of the parasitic signal 122 over the predetermined bandwidth caused by, for example, temperature variations of the WLAN transceiver 115 or variations in the behavior of the power amplifier (not shown) of the WLAN transceiver 115 caused by a different load or a change in the load on the power amplifier (since the reference signal 121 will have these same distortions). For example, the processing device 105 may identify distortions that are common to the parasitic signal 122 and reference signal 121 and remove such distortions from the parasitic signal 122 using any appropriate method.

At block 407, the processing device 105 may use multiplicative correction (or any appropriate method) to correct (scale) the amplitude of the parasitic signal 122 over the predetermined bandwidth to adjust for the impact of the filter(s) (not shown) of the BT transceiver 110 for different frequencies.

At block 408, the processing device 105 may implement a classifier to classify the amplitude of the parasitic signal 122 over the predetermined bandwidth into one of the three scenarios identified in FIGS. 2A-2C. The classifier has knowledge of the amplitude shape and average amplitude of a reference signal (similar to reference signal 121) received over a wide range of frequencies (including the predetermined bandwidth) by the BT transceiver 110 from the WLAN transceiver 115 via parasitic coupling for each of the scenarios discussed in FIGS. 2A-2C (hereinafter referred to as reference data for each of the scenarios discussed in FIGS. 2A-2C). The memory 106 may store the reference data for each of the scenarios discussed in FIGS. 2A-2C. In some embodiments, during manufacture of the device 100, the reference data for each of the scenarios illustrated in FIGS. 2A-2C may be recorded and stored in the memory 106.

The classifier may include a shape detector and an average amplitude detector to determine the shape of the amplitude of the parasitic signal 122 over the predetermined bandwidth and the average amplitude of the parasitic signal 122 over the predetermined bandwidth. The classifier may then compare the average amplitude and shape of the amplitude of the parasitic signal 122 over the predetermined bandwidth to the reference data for each of the scenarios identified in FIGS. 2A-2C to classify the parasitic signal 122 over the predetermined bandwidth into one of the scenarios identified in FIGS. 2A-2C.

When the processing device 105 classifies the amplitude of the parasitic signal 122 over the predetermined bandwidth into the scenario illustrated in FIG. 2B (i.e., determining that the cable 112 is connected to the port 132, but is disconnected from the antenna 111), this can mean that the antenna 111 has been disconnected from the cable 112. However, it may also mean that the cable 112 has been cut or severed at some point along its length. Thus, in some embodiments, in response to classifying the amplitude of the parasitic signal 122 over the predetermined bandwidth into the scenario illustrated in FIG. 2B, the processing device 105 (still executing the classifier) may further determine a point along the length of the cable 112 where the cable 112 been cut (if any). As discussed above, as the energy of the parasitic signal 122 propagates back along the cable 112, it will experience energy loss due to the cable 112 itself. In addition, as discussed herein, the parasitic signal 122 will contain an interference image caused by the reference signal 121 received by the antenna 111 from the antenna 119 via antenna coupling as discussed hereinabove with respect to FIG. 2C. As shown in FIG. 3, there are minima/maxima in the amplitude of the parasitic signal 122 over the range of the predetermined bandwidth caused by the interference image. As a result, the length of cable 112 (i.e., the point at which the cable 112 has been severed) may be based on the interference image (amplitude as a function of frequency) and/or the energy of the parasitic signal 122. Thus, the reference data may include additional cable distance reference data corresponding to the average amplitude and amplitude shape of a reference signal (including the interference image) received over the wide range of frequencies for various lengths of cable 112 (i.e., various potential points where the cable 112 has been severed). The cable distance reference data may also include the average amplitude and amplitude shape of a reference signal received over the wide range of frequencies when the antenna 111 has simply been disconnected from the cable 112.

The processing device 105 may compare the average amplitude and shape of the amplitude of the parasitic signal 122 (including the interference image) over the predetermined bandwidth to the cable distance reference data for each potential point where the cable 112 has been severed to determine the point where the cable 112 has been severed. Upon determining that the cable 112 is connected to the port 132 but is disconnected from the antenna 111 and determining the point where the cable 112 has been severed (if applicable), the processing device 105 may notify the user of such in any appropriate manner.

Figure 5:
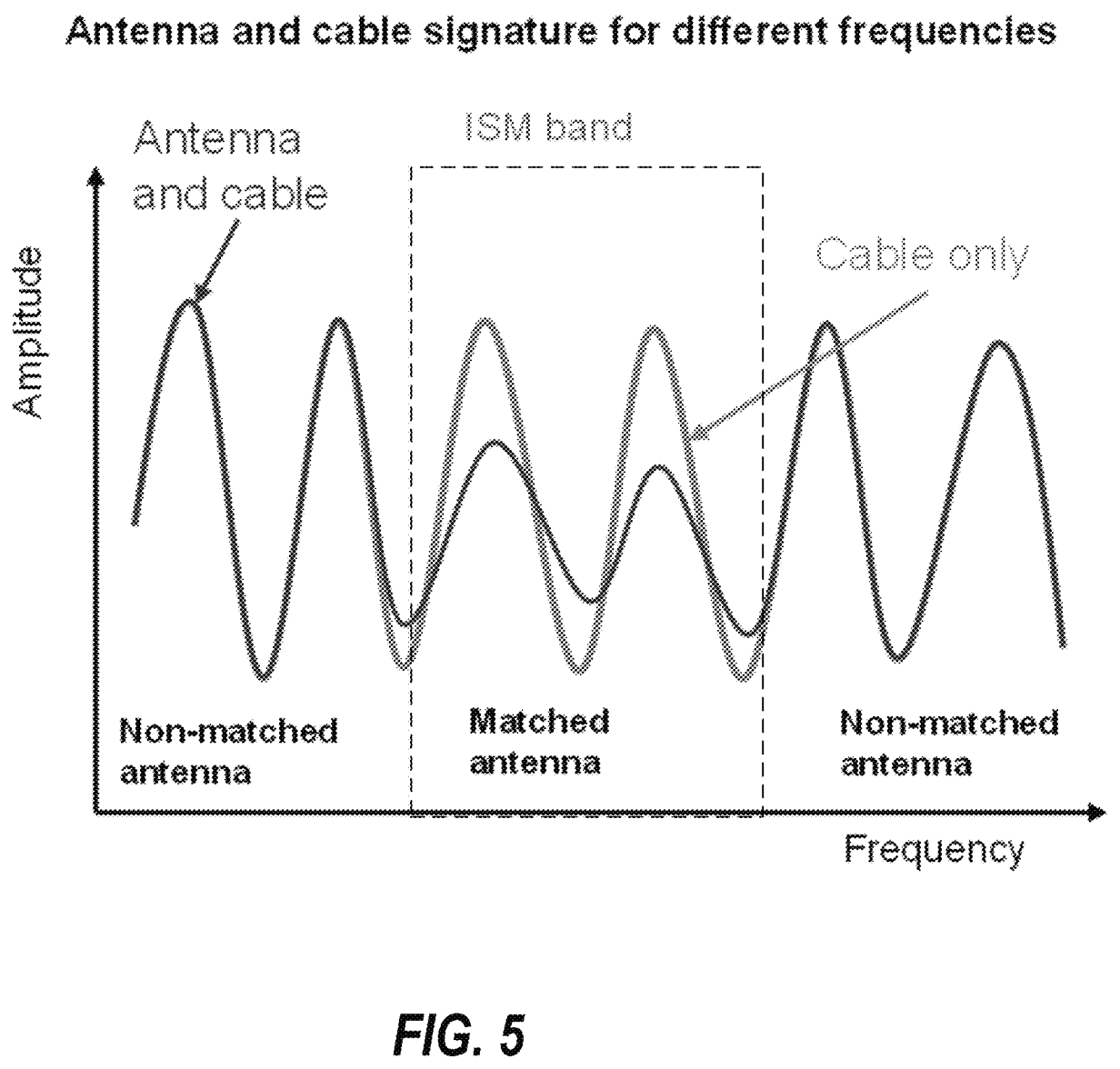

In some embodiments, the processing device 105 (executing module 107B) may perform the antenna/cable disconnect detection method based on a comparison of the parasitic signal 122 with the cable 112 signal outside the ISM band as well as within the ISM band. The cable 112 signal may refer to the reflection of the parasitic signal 122 from the end of the cable 112. Referring to FIG. 5, if the processing device 105 performs a specific scan outside the ISM band, the measured amplitude of the parasitic signal 122 can be approximated by the cable 112 signal (including board-specific and chip-specific behavior). This is because the antenna 111 is not impedance matched outside of the ISM band, so no energy of the parasitic signal 122 is lost. Therefore, if the processing device 105 determines that the amplitude of the parasitic signal 122 (e.g., peak-to-peak amplitude) outside the ISM region is similar to the amplitude (e.g., peak-to-peak amplitude) of the parasitic signal 122 inside the ISM region, then the processing device 105 may determine that the antenna 111 is disconnected from the cable 112.

If the amplitude of the cable 112 signal within the ISM region is different (e.g., amplitude is smaller) from that of the parasitic signal 122 within the ISM region, the processing device 105 may determine that the antenna 111 is connected to the cable 112. If the amplitude of the cable 112 signal within the ISM region is similar to that of the parasitic signal 122 within the ISM region, the processing device 105 may determine that the antenna 111 is disconnected from the cable 112. If the processing device 105 determines that the parasitic signal 122 inside and outside the ISM band does not contain the cable 112 signal (not shown in FIG. 5), then it may determine that the cable 112 is disconnected from the port 132 of the BT transceiver 110.

In some embodiments, the processing device 105 may monitor communications by the WLAN transceiver 115 and BT transceiver 110 to determine if either of the antennas 119 and 111 are potentially disconnected before executing the module 107B to perform the antenna/cable disconnect detection method discussed hereinabove. The processing device 105 may do this by monitoring the WLAN transceiver 115 and the BT transceiver 110 to determine if they are receiving external signals from other arbitrary devices (e.g., computing device 205 in FIG. 6) and in some embodiments by also ensuring that they are detecting changes in the environment as discussed in further detail herein. An arbitrary device may be one that is not paired or synchronized with the device 100 in any way. The wireless communication and environment sensing module 107A (hereinafter referred to as module 107A) may include logic to determine whether the WLAN transceiver 115 and the BT transceiver 110 are able to receive packets from other arbitrary devices and whether they can detect changes in the environment.

Figure 6:
FIG. 6 is a block diagram illustrating the wireless communication device of FIG. 1 performing a wireless communication/environment sensing test, according to some embodiments of the present disclosure.

In the example of FIG. 6, upon executing the module 107A, the processing device 105 may determine if the antenna 119 is receiving packets over communication channel 1 from computing device 205, for example. If the processing device 105 determines that no packets are being received, in some embodiments it may immediately determine that there is a potential problem with the antenna 119 and execute the module 107B to perform the antenna/cable disconnect detection method discussed above.

In other embodiments, the processing device 105 may obtain additional information regarding whether the antenna 119 is able to detect changes in its environment (shown in FIG. 6 as communication channel 2) before executing the module 107B. Changes in the communication channel 2 may correspond to movement of a person or other object within the communication channel 2.

More specifically, the processing device 105 may instruct the BT transceiver 110 to transmit a first signal via antenna 111, and the processing device 105 may measure the received signal strength of the transmitted signal at the antenna 119. The processing device 105 may instruct the BT transceiver 110 to transmit a second signal which is the same as the first signal via antenna 111 and may again measure the received signal strength of the second signal at the antenna 119. If there are changes in the received signal strength between the first and second signal at the antenna 119, the processing device 105 may determine that the device 100 is still able to detect changes in the communication channel 2 and may still be functional. However, if the processing device 105 detects no difference in the received signal strength between the first and second signal at the antenna 119, it may confirm that the antenna 119 is potentially disconnected or broken and execute the module 107B to perform the antenna/cable disconnect detection method discussed above. In some embodiments, the processing device 105 may execute the module 107A continuously, while in other embodiments the processing device 105 executes the module 107A at intervals.

FIG. 6 illustrates the processing device 105 performing communication and/or environment sensing with respect to antenna 119 (using the BT transceiver 110 as a reference device), but it is to be understood that whenever the processing device 105 executes the module 107A, it may perform the communication and/or environment sensing with respect to antenna 111 (using WLAN transceiver 115 as the reference device) as well. In response to determining that either of the antennas 119 and 111 are potentially disconnected using the module 107A, the processing device 105 may execute the module 107B to perform the disconnect detection method on the device (in this example, BT transceiver 110 or WLAN transceiver 115) that includes the potentially disconnected antenna.

The antenna/cable disconnect detection method performed by module 107B allows the processing device 105 to detect when the cable 112 is connected to the port 132 and when the antenna 111 is connected to the cable 112 (e.g., the scenario of FIG. 2C), but cannot detect when the antenna 111 is connected to the cable 112 with a poor connection. When the antenna 111 is connected to the cable 112 with a poor connection (e.g., the antenna 111 is close to metal), the BT transceiver 110 is sensitive to impedance changes in the antenna 111 (e.g., red curve sensitivity). Thus, in response to determining that the cable 112 is connected to the port 132 and that the antenna 111 is connected to the cable 112 (i.e., FIG. 2C) based on the antenna/cable disconnect detection method performed by module 107B, the processing device 105 may execute the antenna connection quality module 107C (hereinafter referred to as module 107C) to notify a user that an additional disconnection test requiring user actions (e.g., touching the antenna 111) is required to determine whether the antenna 111's connection to the cable 112 is in poor condition.

In some embodiments, upon executing the module 107C, the processing device 105 may enter an impedance monitoring mode and provide a user with instructions to perform some action(s) (e.g., touch the antenna 111 with their hand and/or move the antenna 111) within a predefined time period (e.g., the next ten seconds). The processing device 105 may detect the impedance changes of antenna 111 caused by the user's actions within the predefined time period and determine whether the antenna 111 is connected to the cable 112 with a poor connection based on the detected impedance changes. For example, in response to detecting an impedance change that is beyond a threshold level, the processing device 105 may determine that the antenna 111's connection to the cable 112 is in poor condition. Upon determining that the antenna 111's connection to the cable 112 is in poor condition, the processing device 105 may notify the user of such in any appropriate manner.

Figure 7:
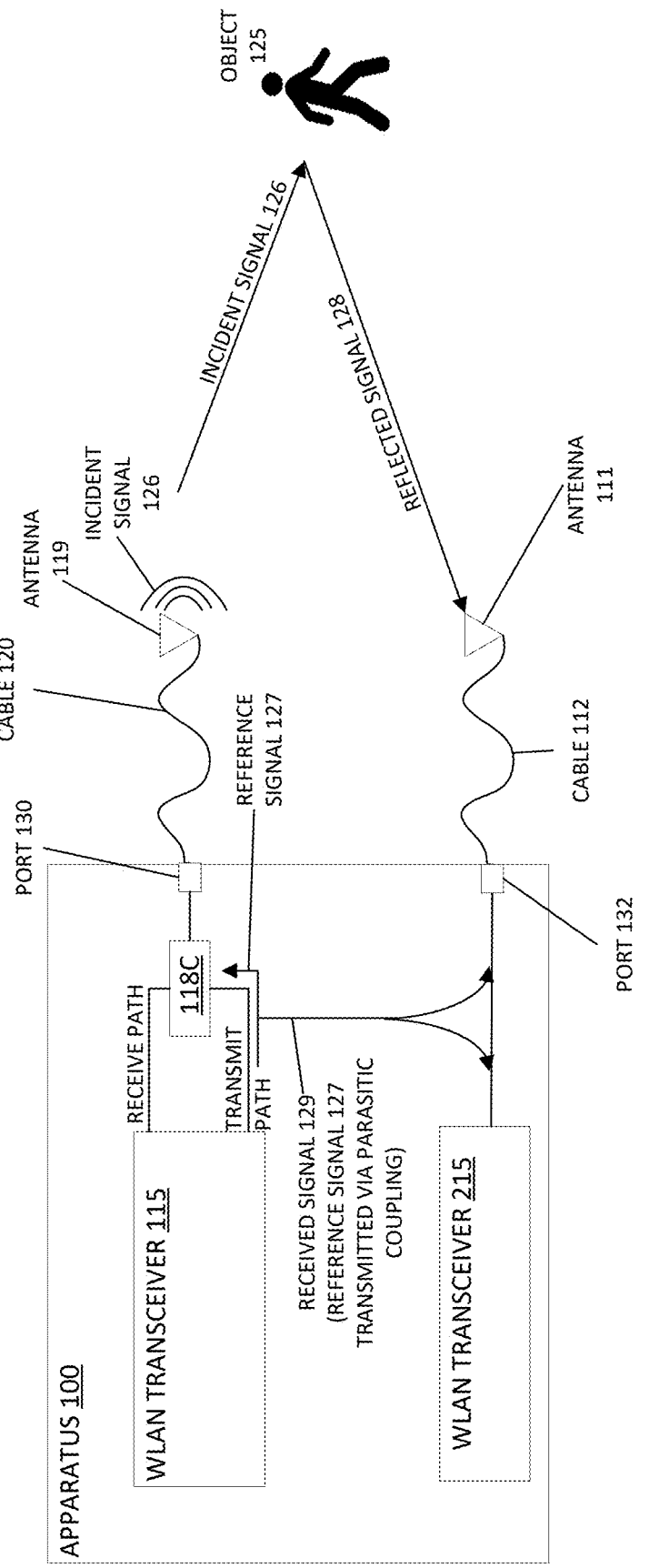
FIG. 7 is a block diagram illustrating the wireless communication device of FIG. 1 using Wi-Fi sensing to perform some of the antenna/cable disconnect detection functions described herein, according to some embodiments of the present disclosure.

FIG. 7 illustrates the device 100 when the first and second devices are synchronized and more specifically, illustrates the device 100 implemented with a 2×2 Wi-Fi configuration. Two transceivers may be considered synchronized if both transceivers are implemented on a single chip with a common signal source (e.g., phase locked look (PLL), voltage-controlled oscillator (VCO)). As can be seen, instead of BT transceiver 110, device 100 now comprises a second WLAN transceiver 215 co-located with WLAN transceiver 115. In embodiments where the devices involved in the antenna/cable disconnect detection are synchronized, the processing device 105 may optionally (when executing module 107B) utilize Wi-Fi sensing (also referred to herein as wireless sensing) for performing antenna/cable disconnect detection (as opposed to the method for antenna/cable disconnect detection discussed with respect to FIGS. 1-4) and may optionally (when executing module 107A) utilize Wi-Fi sensing for determining whether WLAN transceiver 115 and WLAN transceiver 215 can sense environmental changes (as opposed to the method for environment sensing discussed with respect to FIG. 6).

As shown in FIG. 7, during normal operation of the device 100, the antenna 119 may continuously transmit reference signals 127 into the environment. As the reference signals 127 travel on the transmit path of the T/R switch 118C, they may be received by the Rx chain 118B (not shown in FIG. 7) of the WLAN transceiver 115 via the receive path of the T/R switch 118C. In some embodiments, the reference signals 127 may be received by the Rx chain 118B via coupling occurring inside the WLAN transceiver 115 or coupling outside the WLAN transceiver (i.e., coupling may be occur before or after the T/R switch 118C). It should be noted that the signal that is actually transmitted by the antenna 119 (shown as incident signal 126 in FIG. 7) may be different from the reference signal 127 due to reflection caused by improper operation of the antenna 119. In addition, as the reference signals 127 travel on the transmit path of the T/R switch 118C, they may be transmitted (as received signals 129) to the transmit/receive path of the WLAN transceiver 215 via parasitic or spatially designed coupling as shown in FIG. 7.

In addition, as the incident signals 126 travel into the environment, they may reflect off of an object 125 and the reflected signal 128 may be received by the antenna 111. When performing environment sensing, the processing device 105 may use the reflected signals 128 to detect events or changes such as motion of the object 125, for example. Because the WLAN transceiver 115 and the WLAN transceiver 215 are synchronized, the processing device 105 has phase information for the incident signal 126 (and thus the corresponding reflected signal 128). The phase information may inform the processing device 105 about the time at which an incident signal 126 was transmitted and the content thereof which allows it to determine a corresponding reflected signal 128 (and received signal 129) for each incident signal 126. As the WLAN transceiver 115 continues to transmit incident signals 126 (via antenna 119) over time, the processing device 105 may use the corresponding reflected signals 128 received at the antenna 111 to determine the distance to the object 125 (or, travelling distance of the reflected signals 128) over time using the time difference between incident signals 126 and their corresponding reflected signals 128.

Figure 8:
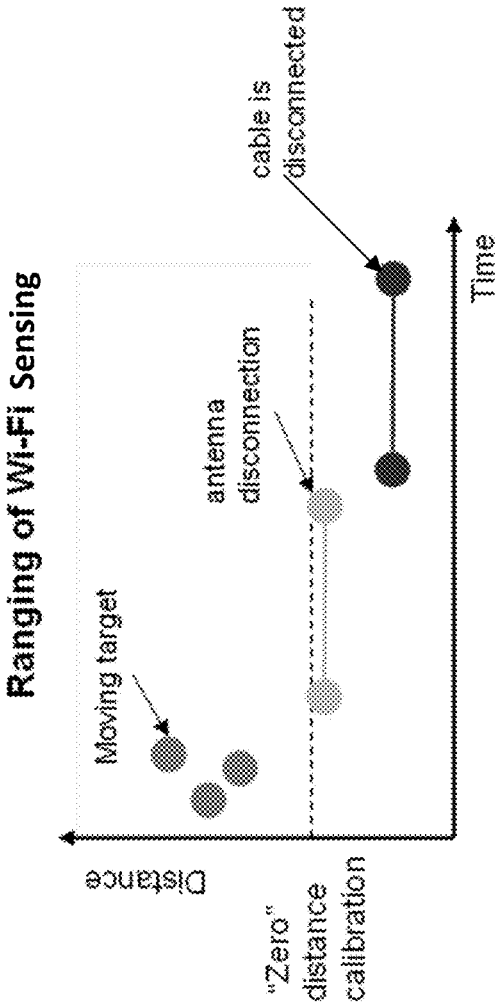
FIG. 8 is a diagram illustrating different antenna/cable disconnection scenarios as a function of distance and time of an object detected using Wi-Fi sensing, according to some embodiments of the present disclosure.

Referring also to FIG. 8, if during normal operation the antenna 111 and/or the cable 112 are disconnected, no reflected signals 128 will be received by the WLAN transceiver 215. The processing device 105 may detect such a disconnection based on the cable 112 signal (i.e., the reflection of the received signal 129 from the end of the cable 112) using Wi-Fi sensing. Because Wi-Fi sensing measures reflection from the open end of the cable 112, the cable 112 signal may correspond to a signal reflected off of an artificial non-moving object that is N distance away (where N corresponds to the distance of the cable 112). When the antenna 111 is disconnected, the processing device 105 may only detect the received signal 129 including the cable 112 signal. Thus, if over time the processing device 105 only detects received signals 129 including a cable 112 signal that indicates being reflected off of a non-moving object that is N distance away, it may determine that the antenna 111 has been disconnected as shown in FIG. 8.

If over time the processing device 105 detects received signals 129 including a cable 112 signal that indicates being reflected off of a non-moving object that is closer than N distance away (or, closer than N distance away and outside a threshold proximity of N distance), it may determine that the cable 112 has been disconnected from the port 132 since a real target cannot be closer than the length of the cable 112 as shown in FIG. 8.

In some embodiments, the processing device 105 may utilize Wi-Fi sensing to perform antenna/cable disconnect detection based on the parasitic and reflection paths of a received signal 129. As discussed herein, when a received signal 129 is detected at the transmit/receive path of the WLAN transceiver 215, the energy of the signal may follow two paths: a parasitic path towards the WLAN transceiver 215 and a reflected path along the cable 112 which is ultimately reflected back to the WLAN transceiver 215. The processing device 105 may use the phase information contained in a received signal 129 to differentiate between the parasitic and reflected paths of the received signal 129.

Figure 9:
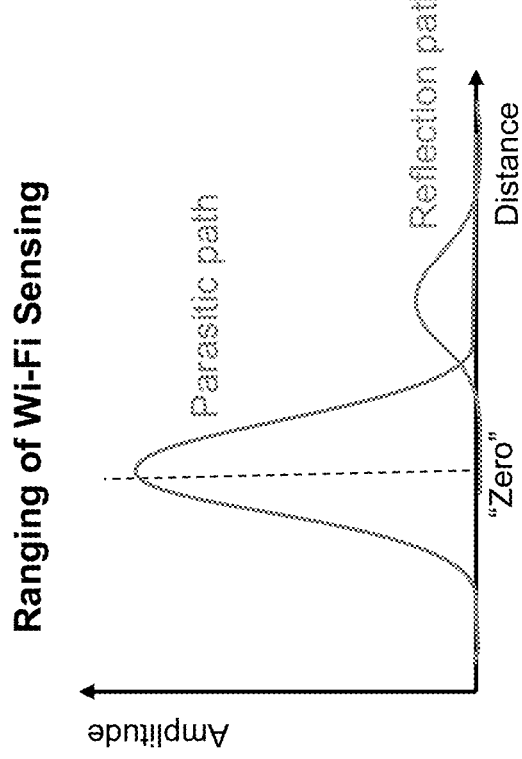
FIG. 9 is a diagram illustrating parasitic and reference paths of a parasitic reference signal detected using Wi-Fi sensing, according to some embodiments of the present disclosure.

When both the parasitic and reflected paths of the received signal 129 are present, the processing device 105 may determine that the antenna 111 is disconnected. When only the parasitic path is present, the processing device 105 may determine that the cable 112 has been disconnected from the WLAN transceiver 215. This is illustrated by FIG. 9 which illustrates the amplitude of the parasitic and reflected paths over distance of the cable 112. As can be seen, at "zero" distance (i.e., at the port 132), the amplitude of the parasitic path is at maximum, and the amplitude of the reflected path is zero. As the cable distance increases (i.e., the point at which the cable 112 may be severed is further along its length), the amplitude of the parasitic path decreases, and the amplitude of the reflected path increases up to a certain point. To measure the ranging spectrum, the processing device 105 may scan several Wi-Fi channels, and may use any appropriate super-resolution algorithm to extract the spectrum such as correlation (IFFT).

Figure 10:
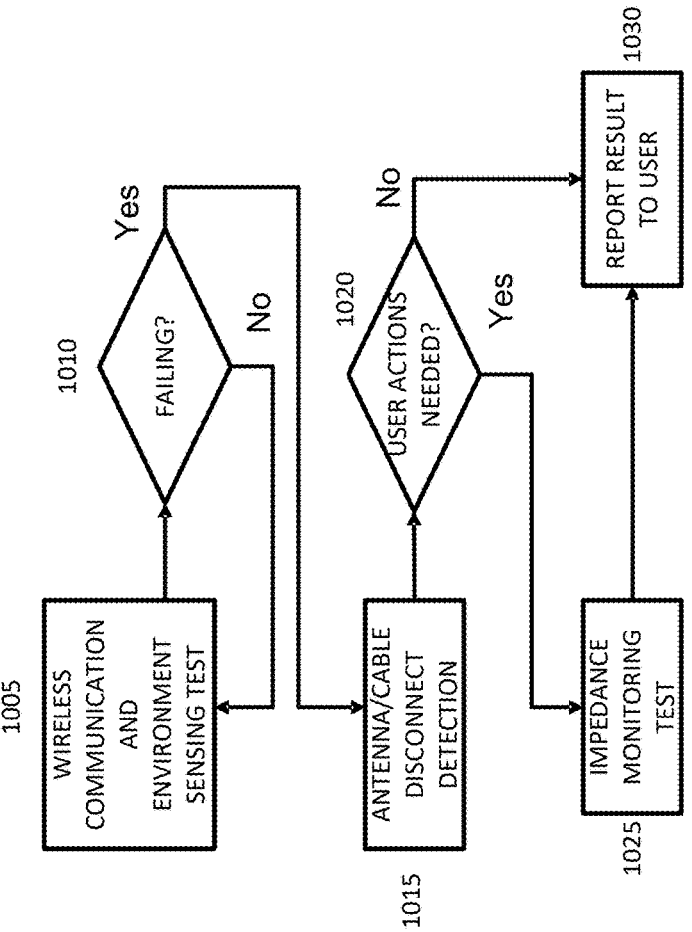
FIG. 10 is a flow diagram of a method of antenna/cable disconnect detection, according to some embodiments of the present disclosure.

FIG. 10 is a flow diagram of a method 1000 for detecting antenna and/or cable disconnection using two or more co-located wireless communication devices, in accordance with some embodiments of the present disclosure. Method 1000 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 1000 may be performed by the processing device 105 executing module 107.

With reference to FIG. 1 as well, at block 1005, the processing device 105 (executing module 107A) may monitor communications by the WLAN transceiver 115 and BT transceiver 110 to determine if any of the antennas 119 and 111 are potentially disconnected before executing the module 107B to perform the antenna/cable disconnect detection method discussed above. The processing device 105 may do this by monitoring the antennas 119 and 111 to determine if they are receiving external signals from other arbitrary devices (e.g., computing device 205 in FIG. 6) and by also ensuring that they are each able to detect changes in the environment as discussed in further detail herein.

At decision block 1010, if the processing device 105 determines that antennas 119 and 111 are able to receive external signals and are able to detect changes in the environment, the processing device 105 may operate the device 100 as normal and continue monitoring the antennas 119 and 111. In response to determining that either of the antennas 119 and 111 are unable to receive external signals or are unable to detect changes in the environment, at block 1015 the processing device 105 may execute the module 107B to perform the antenna/cable disconnect detection method with respect to the antenna that is unable to receive external signals or detect changes in the environment.

At decision block 1020, if the processing device 105 determines that either the cable 112 is disconnected, or that only the cable 112 is connected, it may report such to the user at block 1030. If the processing device 105 determines that both the cable the cable 112 and the antenna 111 are connected or there are disconnections that cannot be determined with sufficient reliability, it may execute the antenna connection quality module 107C (hereinafter referred to as module 107C) to notify a user that an additional disconnection test requiring user actions (e.g., touching the antenna 111) is required to determine whether the antenna 111's connection to the cable 112 is in poor condition. This is because the antenna/cable disconnect detection method performed by module 107B allows the processing device 105 to detect when the cable 112 and/or antenna 111 is disconnected/connected, but not when the antenna 111 is connected to the cable 112 with a poor connection or when additional reliability of the disconnections determined by the antenna/cable disconnect detection method performed by module 107B is required. When the antenna 111 is connected to the cable 112 with a poor connection (e.g., the antenna 111 is close to metal), the BT transceiver 110 is sensitive to impedance changes in the antenna 111 (e.g., red curve sensitivity).

At block 1025, upon executing the module 107C, the processing device 105 may enter an impedance monitoring mode and provide a user with instructions to perform some action(s) (e.g., touch the antenna 111 with their hand and/or move the antenna 111) within a predefined time period (e.g., the next ten seconds). The processing device 105 may detect the impedance changes of antenna 111 caused by the user's actions within the predefined time period and determine whether the antenna 111 is connected to the cable 112 with a poor connection based on the detected impedance changes. For example, in response to detecting an impedance change that is beyond a threshold level, the processing device 105 may determine that the antenna 111's connection to the cable 112 is in poor condition. At block 1030, the processing device 105 may notify the user based on the outcome of the impedance monitoring mode.

FIG. 11A is a flow diagram of a method 1100 for detecting antenna and/or cable disconnection using two or more co-located wireless communication devices, in accordance with some embodiments of the present disclosure. Method 1100 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 1100 may be performed by the processing device 105 executing module 107B.

Referring also to FIG. 1, at block 1105, the processing device 105 may utilize the Tx chain 118A to transmit a reference signal 121 over a predetermined bandwidth using the antenna 119. The T/R switch 118C may couple the port 130 to the Tx chain 118A to allow for transmission of the reference signal 121 via the antenna 119. As the reference signal 121 travels from the Tx chain 118A to the T/R switch 118C (the transmit path of the T/R switch 118C), it may be received by the Rx chain 118B via the receive path of the T/R switch 118C as shown in FIG. 1. In some embodiments, the reference signal 121 may be received by the Rx chain 118B via coupling occurring inside the WLAN transceiver 115 or coupling outside the WLAN transceiver (i.e., coupling may be occur before or after the T/R switch 118C). It should be noted that the signal that is actually transmitted by the antenna 119 (shown as Tx signal 123 in FIG. 1) may be different from the reference signal 121 due to reflection caused by improper operation of the antenna 119. In addition, as the reference signal 121 travels from the Tx chain 118A to the T/R switch 118C, it may be transmitted (as parasitic signal 122) to the transmit/receive path of the BT transceiver 110 via parasitic or spatially designed coupling as shown in FIG. 1.

At block 1115, the processing device 105 may extract the amplitude of the parasitic signal 122 (e.g., extract the amplitude from each parasitic signal 122 tone or from each channel the parasitic signal 122 is received over) and determine the amplitude of the parasitic signal 122 over the predetermined bandwidth (i.e., the ratio of the different amplitudes of the parasitic signal 122 over the predetermined bandwidth). This is because as discussed hereinabove, the amplitude ratio of the parasitic signal 122 for multiple frequencies in the predetermined bandwidth behaves differently for different antenna/cable disconnection scenarios as discussed with respect to FIGS. 2A-2C.

In some embodiments, the processing device 105 may extract the amplitude of the reference signal 121 (e.g., extract the amplitude from each received signal 121 tone or from each channel the reference signal 121 is received over) and determine the amplitude of the reference signal 121 over the predetermined bandwidth (i.e., the ratio of the different amplitudes of the reference signal 121 over the predetermined bandwidth). The processing device 105 may utilize the amplitude of the reference signal 121 over the predetermined bandwidth to compensate for distortions in the amplitude of the parasitic signal 122 over the predetermined bandwidth caused by, for example, temperature variations of the WLAN transceiver 115 or variations in the behavior of the power amplifier (not shown) of the WLAN transceiver 115 caused by a different load or a change in the load on the power amplifier (since the reference signal 121 will have these same distortions). For example, the processing device 105 may identify distortions that are common to the parasitic signal 122 and reference signal 121 and remove such distortions from the parasitic signal 122 using any appropriate method.

At block 1120, the processing device 105 may implement a classifier to classify the amplitude of the parasitic signal 122 over the predetermined bandwidth into one of the three scenarios identified in FIGS. 2A-2C. The classifier has knowledge of the amplitude shape and average amplitude of a reference signal received over a wide range of frequencies (including the predetermined bandwidth) by the BT transceiver 110 from the WLAN transceiver 115 via parasitic coupling for each of the scenarios discussed in FIGS. 2A-2C (hereinafter referred to as reference data for each of the scenarios discussed in FIGS. 2A-2C). The memory 106 may store the reference data for each of the scenarios discussed in FIGS. 2A-2C. In some embodiments, during manufacture of the device 100, the reference data for each of the scenarios illustrated in FIGS. 2A-2C may be recorded and stored in the memory 106.

The classifier may include a shape detector and an average amplitude detector to determine the shape of the amplitude of the parasitic signal 122 over the predetermined bandwidth and the average amplitude of the parasitic signal 122 over the predetermined bandwidth. The classifier may then compare the average amplitude and shape of the amplitude of the parasitic signal 122 over the predetermined bandwidth to the reference data for each of the scenarios identified in FIGS. 2A-2C to classify the parasitic signal 122 over the predetermined bandwidth into one of the scenarios identified in FIGS. 2A-2C.

When the processing device 105 classifies the amplitude of the parasitic signal 122 over the predetermined bandwidth into the scenario illustrated in FIG. 2B (i.e., determining that the cable 112 is connected to the port 132, but is disconnected from the antenna 111), this can mean that the antenna 111 has been disconnected from the cable 112. However, it may also mean that the cable 112 has been cut or severed at some point along its length. Thus, in some embodiments, in response to classifying the amplitude of the parasitic signal 122 over the predetermined bandwidth into the scenario illustrated in FIG. 2B, the processing device 105 (still executing the classifier) may further determine a point along the length of the cable 112 where the cable 112 been cut (if any). As discussed above, as the energy of the parasitic signal 122 propagates back along the cable 112, it will experience energy loss due to the cable 112 itself. However, the shorter the length of cable 112 (i.e., the closer to the port 132 the cable 112 has been severed), the lower the amount of energy loss the parasitic signal 122 may experience. Thus, the reference data may include additional cable distance reference data corresponding to the average amplitude and amplitude shape of a reference signal received over the wide range of frequencies for various lengths of cable 112 (i.e., various potential points where the cable 112 has been severed). The cable distance reference data may also include the average amplitude and amplitude shape of a reference signal received over the wide range of frequencies when the antenna 111 has simply been disconnected from the cable 112.

The processing device 105 may compare the average amplitude and shape of the amplitude of the parasitic signal 122 over the predetermined bandwidth to the cable distance reference data for each potential point where the cable 112 has been severed to determine the point where the cable 112 has been severed. Upon determining that the cable 112 is connected to the port 132 but is disconnected from the antenna 111 and determining the point where the cable 112 has been severed (if applicable), the processing device 105 may notify the user of such in any appropriate manner.

FIG. 11B is a flow diagram of a method 1150 for detecting antenna and/or cable disconnection using two or more co-located wireless communication devices using Wi-Fi sensing, in accordance with some embodiments of the present disclosure. Method 1150 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 1150 may be performed by the processing device 105 executing module 107B.

Referring also to FIG. 7, at block 1155, during normal operation of the device 100, the antenna 119 may continuously transmit reference signals 127, which (as discussed hereinabove) are ultimately transmitted via the antenna 119 into the environment as incident signals 126. As the reference signals 127 travel on the transmit path of the T/R switch 118C, they may be received by the Rx chain 118B (not shown in FIG. 7) of the WLAN transceiver 115 via the receive path of the T/R switch 118C. In some embodiments, the reference signals 127 may be received by the Rx chain 118B via coupling occurring inside the WLAN transceiver 115 or coupling outside the WLAN transceiver (i.e., coupling may be occur before or after the T/R switch 118C). At block 1160, as the reference signals 127 travel on the transmit path of the T/R switch 118C, they may be transmitted (as received signals 129) to the transmit/receive path of the WLAN transceiver 215 via parasitic or spatially designed coupling as shown in FIG. 7.

In addition, as the incident signals 126 travel into the environment, they may reflect off of an object 125 and the reflected signal 128 may be received by the antenna 111 at block 1165. Because the WLAN transceiver 115 and the WLAN transceiver 215 are synchronized, the processing device 105 has phase information for each incident signal 126 (and thus the corresponding reflected signal 128). The phase information may inform the processing device 105 about the time at which an incident signal 126 was transmitted and the content thereof which allows it to determine a corresponding reflected signal 128 (and received signal 129) for each incident signal 126. As the WLAN transceiver 115 continues to transmit incident signals 126 (via antenna 119) over time, the processing device 105 may at block 1170 perform antenna/cable disconnection detection based on the received signals 129 and reflected signals 128 received at the antenna 111 (if any) as discussed below with respect to FIG. 8 as well.

Referring also to FIG. 8, if during normal operation the antenna 111 and/or the cable 112 are disconnected, no reflected signals 128 will be received by the WLAN transceiver 215. The processing device 105 may detect such a disconnection based on the cable 112 signal (i.e., the reflection of the received signal 129 from the end of the cable 112) using Wi-Fi sensing. Because Wi-Fi sensing measures reflection from the open end of the cable 112, the cable 112 signal may correspond to a signal reflected off of an artificial non-moving object that is N distance away (where N corresponds to the distance of the cable 112). When the antenna 111 is disconnected, the processing device 105 may only detect the received signal 129 including the cable 112 signal. Thus, if over time the processing device 105 only detects received signals 129 including a cable 112 signal that indicates being reflected off of a non-moving object that is N distance away, it may determine that the antenna 111 has been disconnected as shown in FIG. 8.

If over time the processing device 105 detects received signals 129 including a cable 112 signal that indicates being reflected off of a non-moving object that is closer than N distance away (or, closer than N distance away and outside a threshold proximity of N distance), it may determine that the cable 112 has been disconnected from the port 132 since a real target cannot be closer than the length of the cable 112 as shown in FIG. 8.

FIG. 12 is a simplified block diagram 1200 of the multi-protocol communication device 100 with a more detailed view of the WLAN transceiver 115 inset, in accordance with some embodiments of the present disclosure. The device 100 may include a general purpose input/output (GPIO) 1205, the BT transceiver 110 and the WLAN transceiver 115. The GPIO 1205 may comprise an uncommitted digital signal pin which may be used as an input or output for the BT transceiver 110 and/or the WLAN transceiver 115. The WLAN transceiver 115 may include a processing device 1206, a memory 1210, a physical layer chip 1215 and a media access control (MAC) layer chip 1220. The physical layer chip 1215 may handle conversion of a signal from a clocked digital format into an analog format suitable for longer range transmission and vice versa. The MAC layer chip 1220 may assemble bits received from the physical layer chip 1215 into packets and validate them, as well as receive packets of data from the processing device 1206 for example, and convert them to streams of bits to be provided to the physical layer chip 1215. It should be noted that FIG. 12 illustrates an embodiment where each of the BT transceiver 110 and the WLAN transceiver 115 include their own dedicated processing device and memory, and the instructions for performing the techniques described herein may be included as firmware within the memory of the BT transceiver 110 and the WLAN transceiver 115.

Figure 13:
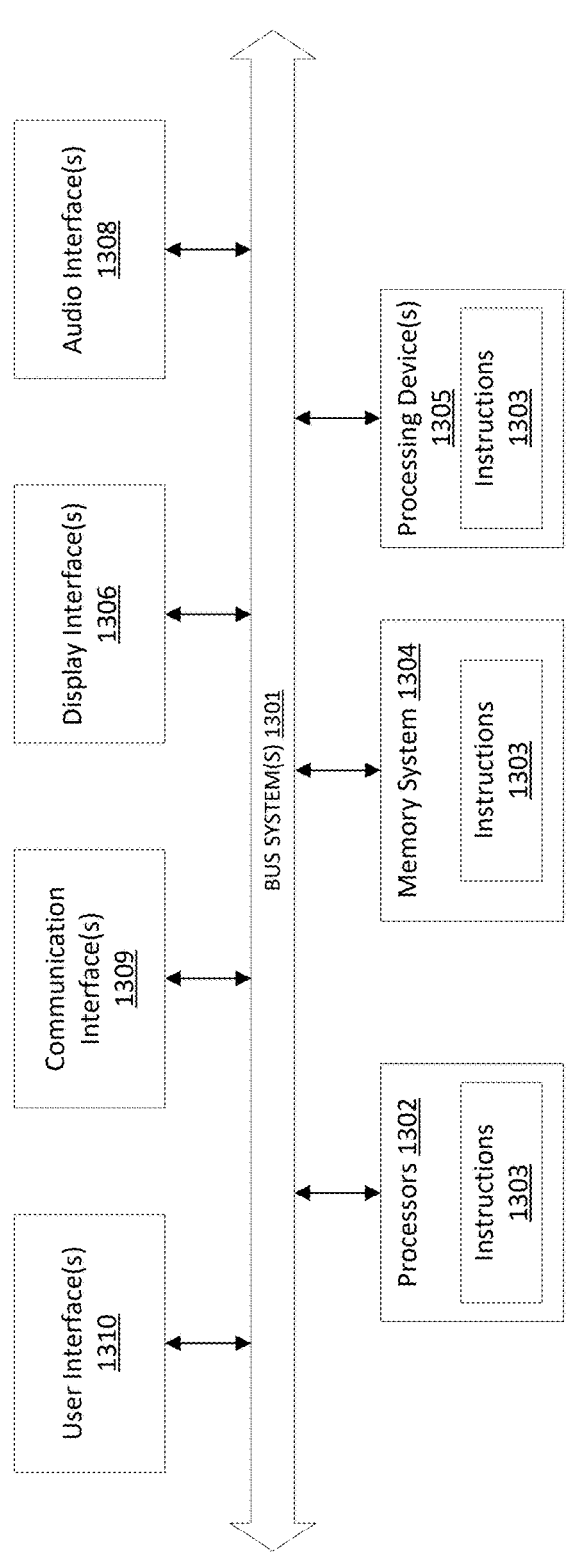
FIG. 13 illustrates a communication device, according to some embodiments of the present disclosure.

FIG. 13 is a block diagram illustrating a communication device 1300, in accordance with some embodiments of the present disclosure. The communication device 1300 may fully or partially include and/or operate the example embodiments of the communication device 100 or portions thereof as described with respect to FIGS. 1-9. The communication device 1300 may be in the form of a computer system within which sets of instructions may be executed to cause the communication device 1300 to perform any one or more of the methodologies discussed herein. The communication device 1300 may operate as a standalone device or may be connected (e.g., networked) to other machines. In a networked deployment, the communication device 1300 may operate in the capacity of a server or a client machine in server-client network environment, or as a peer machine in a P2P (or distributed) network environment.

The communication device 1300 may be an Internet of Things (IoT) device, a server computer, a client computer, a personal computer (PC), a tablet, a set-top box (STB), a voice controlled hub (VCH), a Personal Digital Assistant (PDA), a mobile telephone, a web appliance, a network router, switch or bridge, a television, speakers, a remote control, a monitor, a handheld multi-media device, a handheld video player, a handheld gaming device, or a control panel, or any other machine capable of executing a set of instructions (sequential or otherwise) that specify actions to be taken by that machine. Further, while only a single communication device 1300 is illustrated, the term "device" shall also be taken to include any collection of machines that individually or jointly execute a set (or multiple sets) of instructions to perform any one or more of the methodologies discussed herein.

The communication device 1300 is shown to include processor(s) 1302. In embodiments, the communication device 1300 and/or processors(s) 1302 may include processing device(s) 1305 such as a System on a Chip processing device, developed by Cypress Semiconductor Corporation, San Jose, Calif. Alternatively, the communication device 1300 may include one or more other processing devices known by those of ordinary skill in the art, such as a microprocessor or central processing unit, an application processor, a host controller, a controller, special-purpose processor, digital signal processor (DSP), an application specific integrated circuit (ASIC), a field programmable gate array (FPGA), or the like. Bus system 1301 may include a communication block (not shown) to communicate with an internal or external component, such as an embedded controller or an application processor, via communication interfaces(s) 1309 and/or bus system 1301.

Components of the communication device 1300 may reside on a common carrier substrate such as an IC die substrate, a multi-chip module substrate, or the like. Alternatively, components of the communication device 1300 may be one or more separate ICs and/or discrete components.

The memory system 1304 may include volatile memory and/or non-volatile memory which may communicate with one another via the bus system 1301. The memory system 1304 may include, for example, random access memory (RAM) and program flash. RAM may be static RAM (SRAM), and program flash may be a non-volatile storage, which may be used to store firmware (e.g., control algorithms executable by processor(s) 1302 to implement operations described herein). The memory system 1304 may include instructions 1303 that when executed perform the methods described herein. Portions of the memory system 1304 may be dynamically allocated to provide caching, buffering, and/or other memory-based functionalities.

The memory system 1304 may include a drive unit providing a machine-readable medium on which may be stored one or more sets of instructions 1303 (e.g., software) embodying any one or more of the methodologies or functions described herein. The instructions 1303 may also reside, completely or at least partially, within the other memory devices of the memory system 1304 and/or within the processor(s) 1302 during execution thereof by the communication device 1300, which in some embodiments, constitutes machine-readable media. The instructions 1303 may further be transmitted or received over a network via the communication interfaces(s) 1309. The communication interface(s) 1309 may be where the communication device 100 discussed herein is implemented.

While a machine-readable medium is in some embodiments a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing or encoding a set of instructions for execution by the machine and that cause the machine to perform any one or more of the example operations described herein. The term "machine-readable medium" shall accordingly be taken to include, but not be limited to, solid-state memories, and optical and magnetic media.

The communication device 1300 is further shown to include display interface(s) 1306 (e.g., a liquid crystal display (LCD), touchscreen, a cathode ray tube (CRT), and software and hardware support for display technologies), audio interface(s) 1308 (e.g., microphones, speakers and software and hardware support for microphone input/output and speaker input/output). The communication device 1300 is also shown to include user interface(s) 1310 (e.g., keyboard, buttons, switches, touchpad, touchscreens, and software and hardware support for user interfaces).

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "transmitting," "receiving," "comparing," "determining," "detecting," "classifying," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMS, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the embodiments should, therefore, be determined with reference to the appended claims, along with the full scope of equivalents to which such claims are entitled.

What is claimed is:
1. An apparatus comprising:
a first device configured to transmit a reference signal;

a second device that is co-located with the first device, the second device configured to receive a parasitic signal corresponding to the reference signal, wherein the parasitic signal is received via coupling between the first device and the second device;

a port configured to couple the second device to a first end of a cable, wherein a second end of the cable is configured to connect to an antenna; and a processing device operatively coupled to the first device and the second device, the processing device configured to:

determine an amplitude of the parasitic signal over different frequencies in a predefined bandwidth; and determine, based at least in part on the amplitude of the parasitic signal over the predefined bandwidth, a disconnect status of one or more of the antenna and the cable, wherein to determine the disconnect status, the processing device is further configured to compare the amplitude and a shape of the parasitic signal over the predefined bandwidth to reference data for each of a set of disconnect scenarios; and classify the amplitude and the shape of the parasitic signal over the predefined bandwidth into one of the set of disconnect scenarios based on the comparing.

2. The apparatus of claim 1, wherein the set of disconnect scenarios includes:

a first scenario where the first end of the cable is connected to the port of the second device and the antenna is connected to the second end of the cable;

a second scenario where the first end of the cable is connected to the port of the second device but is severed at a point along its length; and a third scenario where the first end of the cable is disconnected from the port of the second device.

3. The apparatus of claim 2, wherein the processing device is further configured to:

in response to classifying the amplitude and the shape of the parasitic signal over the predefined bandwidth into the second scenario, compare the amplitude and the shape of the parasitic signal over the predefined bandwidth to cable distance reference data for each of a set of points along the cable to determine the point along its length where the cable has been severed.

4. The apparatus of claim 2, wherein the processing device is further to:

in response to classifying the amplitude and the shape of the parasitic signal over the predefined bandwidth into the first scenario, provide instructions to interact with the antenna;

detect one or more impedance changes of the antenna caused by interaction with the antenna; and determine a quality of the connection between the antenna and the second end of the cable based on the one or more impedance changes of the antenna.

5. The apparatus of claim 1, wherein the processing device is further configured to:

determine whether the antenna is receiving packets from one or more arbitrary devices; and determine whether the antenna is detecting changes in a local communication environment, wherein the processing device transmits the reference signal via the first device in response to determining that the antenna is not receiving packets from the one or more arbitrary devices or that the antenna is not detecting changes in the local communication environment.

6. The apparatus of claim 5, wherein the processing device determines whether the antenna of the second device is detecting changes in the local communication environment using wireless sensing.

7. A method comprising:

transmitting from a first device, a reference signal;

receiving at a second device that is co-located with the first device, a parasitic signal corresponding to the reference signal, wherein the parasitic signal is received via coupling between the first device and the second device, and wherein the second device comprises a port to couple to a first end of a cable, and wherein a second end of the cable is to couple to an antenna;

determining an amplitude of the parasitic signal over different frequencies of a predefined bandwidth; and determining, based at least in part on the amplitude of the parasitic signal over the predefined bandwidth, a disconnect status of one or more of the antenna and the cable by comparing the amplitude and a shape of the parasitic signal over the predefined bandwidth to reference data for each of a set of disconnect scenarios, and classifying the amplitude and the shape of the parasitic signal over the predefined bandwidth into one of the set of disconnect scenarios based on the comparing.

8. The method of claim 7, wherein the set of disconnect scenarios includes:

a first scenario where the first end of the cable is connected to the port of the second device and the antenna is connected to the second end of the cable;

a second scenario where the first end of the cable is connected to the port of the second device but is severed at a point along its length; and a third scenario where the first end of the cable is disconnected from the port of the second device.

9. The method of claim 8, further comprising:

in response to classifying the amplitude and the shape of the parasitic signal over the predefined bandwidth into the second scenario, comparing the amplitude and the shape of the parasitic signal over the predefined bandwidth to cable distance reference data for each of a set of points along the cable to determine the point along its length where the cable has been severed.

10. The method of claim 8, further comprising:

in response to classifying the amplitude and the shape of the parasitic signal over the predefined bandwidth into the first scenario, providing instructions to interact with the antenna;

detecting one or more impedance changes of the antenna caused by interaction with the antenna; and determining a quality of the connection between the antenna and the second end of the cable based on the one or more impedance changes of the antenna.

11. The method of claim 7, further comprising:

determining whether the antenna is receiving packets from one or more arbitrary devices;

determining whether the antenna is detecting changes in a local communication environment, wherein the reference signal is transmitted from the first device in response to determining that the antenna is not receiving packets from the one or more arbitrary devices or that the antenna is not detecting changes in the local communication environment.

12. The method of claim 11, wherein the determining whether the antenna of the second device is detecting changes in the local communication environment is performed using wireless sensing.

13. A system comprising:

an antenna;

a cable, wherein a second end of the cable is configured to couple to the antenna; and a multi-protocol communication device configured to:

transmit via a first transceiver, a reference signal;

receive via a second transceiver, a parasitic signal corresponding to the reference signal, wherein the parasitic signal is received via coupling between the first transceiver and the second transceiver, wherein the second transceiver is coupled to a first end of the cable via a port of the multi-protocol communication device;

determine an amplitude of the parasitic signal over different frequencies of a predefined bandwidth; and determine, based at least in part on the amplitude of the parasitic signal over the predefined bandwidth, a disconnect status of one or more of the antenna and the cable, wherein to determine the disconnect status, the multi-protocol communication device is further configured to compare the amplitude and a shape of the parasitic signal over the predefined bandwidth to reference data for each of a set of disconnect scenarios; and classify the amplitude and the shape of the parasitic signal over the predefined bandwidth into one of the set of disconnect scenarios based on the comparing.

14. The system of claim 13, wherein the set of disconnect scenarios includes:

a first scenario where the first end of the cable is connected to the port of the second device transceiver and the antenna is connected to the second end of the cable;

a second scenario where the first end of the cable is connected to the port of the second device transceiver but is severed at a point along its length; and a third scenario where the first end of the cable is disconnected from the port of the second device transceiver.

15. The system of claim 14, wherein the multi-protocol communication device is further configured to:

in response to classifying the amplitude and the shape of the parasitic signal over the predefined bandwidth into the second scenario, compare the amplitude and the shape of the parasitic signal over the predefined bandwidth to cable distance reference data for each of a set of points along the cable to determine the point along its length where the cable has been severed.

16. The system of claim 14, wherein the multi-protocol communication device is further to:

in response to classifying the amplitude and the shape of the parasitic signal over the predefined bandwidth into the first scenario, provide instructions to interact with the antenna;

detect one or more impedance changes of the antenna caused by interaction with the antenna; and determine a quality of the connection between the antenna and the second end of the cable based on the one or more impedance changes of the antenna.

17. The system of claim 13, wherein the multi-protocol communication device is further configured to:

determine whether the antenna is receiving packets from one or more arbitrary devices; and determine whether the antenna is detecting changes in a local communication environment, wherein a processing device transmits the reference signal via the first transceiver in response to determining that the antenna is not receiving packets from the one or more arbitrary devices or that the antenna is not detecting changes in the local communication environment.

* * * * *